United States Patent [19]

Kato

[11] Patent Number: 5,676,445
[45] Date of Patent: Oct. 14, 1997

[54] AUTOMOTIVE ILLUMINATING DEVICE

[75] Inventor: Hideyuki Kato, Nishio, Japan

[73] Assignee: Nippondenso Co., Ltd., Kariya, Japan

[21] Appl. No.: 558,093

[22] Filed: Nov. 13, 1995

[30] Foreign Application Priority Data

Nov. 15, 1994 [JP] Japan ................................ 6-280880
Jan. 31, 1995 [JP] Japan ................................ 7-014417

[51] Int. Cl.$^6$ ............................................ F21V 5/04
[52] U.S. Cl. ................... 362/32; 362/61; 362/308; 362/327; 385/901
[58] Field of Search ........................ 362/32, 61, 327, 362/332, 308, 309, 311, 268; 385/33, 36, 901

[56] References Cited

U.S. PATENT DOCUMENTS

| 5,377,288 | 12/1994 | Kashyap et al. | 385/36 |
| 5,408,572 | 4/1995 | Kriege | 385/33 |
| 5,499,166 | 3/1996 | Kato et al. | 362/32 |

FOREIGN PATENT DOCUMENTS

| 623780 | 11/1994 | European Pat. Off. | |
| 678699 | 10/1995 | European Pat. Off. | |
| 4320554A1 | 12/1993 | Germany | |
| 223105 | 12/1983 | Japan | 385/901 |

*Primary Examiner*—Alan Cariaso
*Attorney, Agent, or Firm*—Cushman, Darby & Cushman IP Group of Pillsbury Madison & Sutro LLP

[57] ABSTRACT

A wide-ranged hot zone light distribution is obtained by using one hot zone light distribution lens in a simple construction. The hot zone light distribution lens has a first light reflection surface forming roughly a vertical surface and a second light reflection surface adjacent to the first reflection surface forming a line as a border at the top edge of the reflection surface in a projection direction. A hot zone light distribution includes at least a first range formed by a direct light projected from an optical fiber without being reflected on the first and second reflection surfaces, a second range formed by a reflected light projected after being reflected on the first reflection surface, and a third range formed by a reflected light projected after being reflected on the second reflection surface. The first and the second ranges are extended toward right and left directions from a horizontal center in the light distribution. The first range has a top end increasing its height toward an outside.

12 Claims, 5 Drawing Sheets

AUTOMOTIVE ILLUMINATING DEVICE

CROSS REFERENCE TO RELATED APPLICATIONS

This application is based on and claims priorities of Japanese Patent Applications No. 6-280880 filed Nov. 15, 1994 and No. 7-14417 filed Jan. 31, 1995, the contents of which are incorporated herein by reference.

BACKGROUND OF THE INVENTION

1. Field of the Invention

The present invention generally relates to an automotive illuminating device and, more particularly, to an automotive illuminating device having a light distribution lens.

2. Description of Related Art

A conventional automotive illuminating device disclosed in Japanese Patent Application Laid-Open No. H6-68702 (corresponding to U.S. Pat. No. 5,499,166) has two hot zone light distribution lenses at left and right sides. Each lens shares hot zone light distribution made with two ranges divided in a horizontal direction.

However, since the conventional automotive illuminating device is provided with two hot zone light distribution lenses, the construction thereof is complicated.

SUMMARY OF THE INVENTION

In view of the foregoing problems, it is a primary object of the invention to provide an automotive illuminating device which provides a wide range of light distribution by a simplified construction using one light distribution lens.

According to the present invention, a light distribution having two divided illumination ranges in the left and right sides is formed by using the reflection surface of a light distribution lens so that the light distribution with a wide range can be obtained by a simple construction of the light distribution lens.

Preferably, the two ranges are shifted in the vertical direction by the reflection surface inclining relative to the vertical surface. When the automotive illuminating device is used for the head lamp for a vehicle, the glare against a driver of the vehicle running on the opposite lane can be reduced by disposing the range positioned downward, while distant illumination can be possible by disposing the range positioned upward. As a result, the desired light distribution with only one side facing upward can be obtained.

Preferably, the top end of the range positioned upward increases its height toward the horizontal outside to illuminate far away. An inclination angle of the reflection surface is a half of an inclination angle of the top end of the range positioned upward relative to the horizontal level, while the top end of the range positioned downward is roughly horizontal. Thus, the glare against the driver driving on the opposite lane can be reduced.

Preferably, another range is formed by a reflected light reflected on another reflection surface forming a roughly horizontal surface and disposed besides the reflection surface so that the light distribution having both ranges by the two reflection surfaces can be obtained.

Preferably, the another reflection surface is disposed close to the reflection surface at the top end of the reflection surface with a border line extending in the light projection direction so that the light distribution having a range formed by a direct light projected directly from the light distribution lens without being reflected on either the reflection surface and a range formed by the reflected light projected after being reflected on the reflection surfaces.

Preferably, the light distribution lens includes a hot zone light distribution lens and a flat light distribution lens formed integrally so that no space is formed between both lenses. Thus, changes of light distribution and production of light deficit due to dust and water between the lenses are prevented.

Preferably, the light distribution lens has a light introducing portion which is formed in a square-pillar shape. Thus, the light projected from the rectangular outgoing surface is equal to the light transmitted to the outgoing surface side, the left and right ends of the light distribution range by the direct light draw a straight line, corresponding to the rectangular outgoing surface and the left and right ends of the light distribution range by the reflected light draw a straight line corresponding to the same rectangular outgoing surface. Hence, the border portion of both light distribution ranges can be continued and the unevenness of the light distribution at the border between the ranges can be prevented.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

The preferred embodiments of the present invention are hereinafter described with reference to the accompanying drawings.

Figure 1:
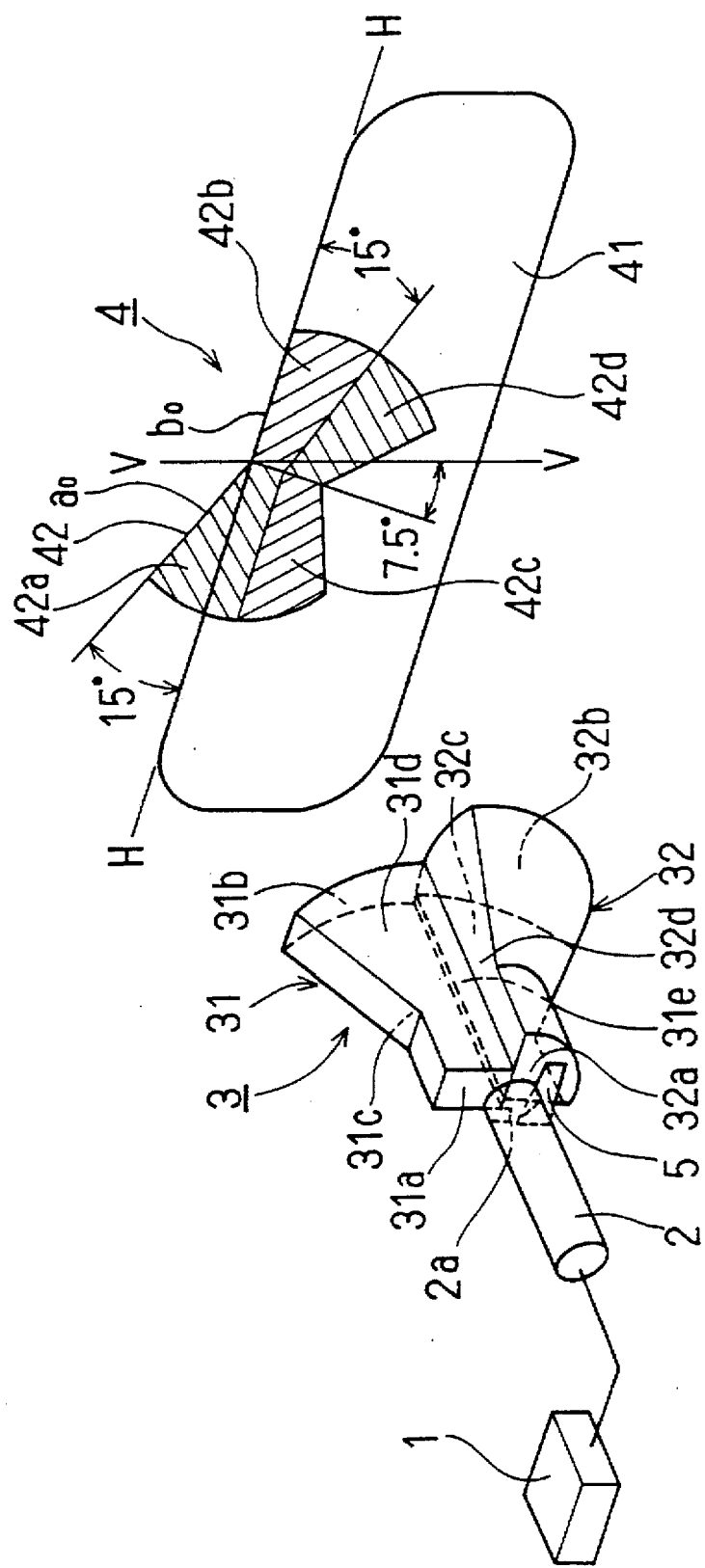
FIG. 1 is a view illustrating light distribution and schematic construction of an automotive illuminating device according to an embodiment of the present invention.

FIG. 1 illustrates an embodiment wherein a light source 1, and an optical fiber 2 receiving the light produced by the light source 1 and projecting the light therefrom are shown. A lighting body (a light distribution lens) 3 such as an automotive head lamp receives the light projected from the optical fiber 2 and projects the light therefrom. A light distribution emitted from the light distribution lens 3 is indicated by numeral 4.

The light distribution lens 3 is constructed by vertically disposing a flat light distribution lens 31 forming a flat light distribution 41 (light distribution ranged widely to left and right sides below a horizontal axis H—H) of the light distribution 4 and a hot zone light distribution lens 32 forming a hot zone light distribution 42 (mostly overlapped with a central portion of the flat light distribution 41 and having a range indicated by oblique lines in the figure) of the light distribution 4.

The flat light distribution lens 31 is made of a material having good heat resistance and light permeability, for example, polycarbonate or an acrylic resin and made into a fan shape. The flat light distribution lens 31 has a light incident surface 31a adhered partially by a transparent adhesive to an upper portion of a light outgoing surface 2a of the optical fiber 2, a light outgoing surface 31b forming a convex lens surface in the vertical direction, left and right side surfaces 31c and 31d each forming a light reflection surface and a bottom surface 31e also forming a light reflection surface. A focal point of the flat light distribution lens 31 is positioned adjacent to the incident surface 31a.

Figure 2:
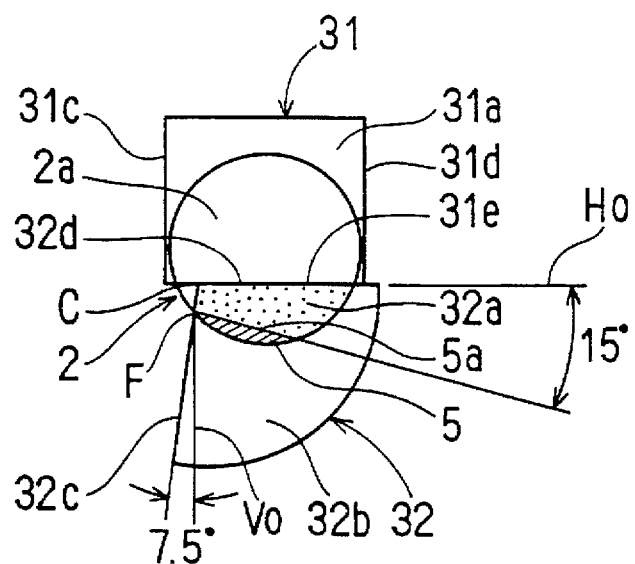
FIG. 2 is a view illustrating a positional relation among an outgoing surface of an optical fiber, each incident surface of a flat light distribution lens and hot zone light distribution lens, and a shade of the automotive illuminating device.

The hot zone light distribution lens 32 is generally in a ¼ conical shape and is made, as the flat light distribution lens 31 is, of a material having good heat resistance and light permeability such as polycarbonate or an acrylic resin. The hot zone light distribution lens 32 has a light incident surface 32a adhered partially by a transparent adhesive to a lower portion of the outgoing surface 2a of the optical fiber 2 with a shade 5 interposed therebetween, a light outgoing surface 32b forming a convex lens surface, a light reflection surface 32c forming generally a vertical surface (for example, as shown in FIG. 2, an inclined surface inclined by 7.5° in a clockwise direction relative to a vertical surface $V_0$ in a light projection direction) and a light reflection surface 32d forming a horizontal surface $H_0$ and being adhered to a bottom surface 31e of the flat light distribution lens 31 by a transparent adhesive. The reflection surface 32d is positioned adjacent to the reflection surface 32c at a top end of the reflection surface 32c with a line C as a border in the light projection direction. The shade 5 shown in FIG. 2 has a cut line 5a inclined by a predetermined angle, for example, 15° in the clockwise direction toward the light projection direction relative to the horizontal surface $H_0$. A focal point F of the outgoing surface 32b forming the convex lens surface is positioned adjacent to the incident surface 32a. As shown in FIG. 2, the focal point F is positioned at a crossing point of the reflection surface 32c and the cut line 5a of the shade 5.

In the light distribution 4, the hot zone light distribution 42 has a range 42a formed by a direct light projected directly from the outgoing surface 32b without being reflected on the reflection surfaces 32c and 32d. The direct light is the incoming light projected to the incident surface 32a of the hot zone light distribution lens 32 from the optical fiber 2. As the focal point F of the outgoing surface 32b is positioned at the crossing point of the reflection surface 32c and the cut line 5a and the cut line 5a of the shade 5 is inclined by 15° in the clockwise direction toward the projection direction, the range 42a has a top end $a_0$ inclined by 15° below the horizontal axis H—H in a counterclockwise direction as shown in FIG. 1.

The hot zone light distribution 42 has a range 42b formed by the reflected light reflected on the reflection surface 32c and projected from the outgoing surface 32b. As shown in FIG. 1, the range 42b having a roughly horizontal top end $b_0$ below the horizontal axis H—H is positioned corresponding to the focal point F of the outgoing surface 32b.

Further, the hot zone light distribution 42 has a range 42c formed by the reflected light reflected on the reflection surface 32c and projected from the outgoing surface 32b, and a range 42d formed by the reflected light reflected on the reflection surface 32d and then on the reflection surface 32c and projected from the outgoing surface 32b. As shown in FIG. 1, the ranges 42c and 42d are formed below the ranges 42a and 42b respectively corresponding to the focal point F of the outgoing surface 32b. In the hot zone light distribution 42, although a range formed by the reflected light projected from the outgoing surface 32b after being reflected on the reflection surfaces 32c and 32d can actually exist, the range is omitted in the figure because the luminous intensity of the range is low.

Figure 3:
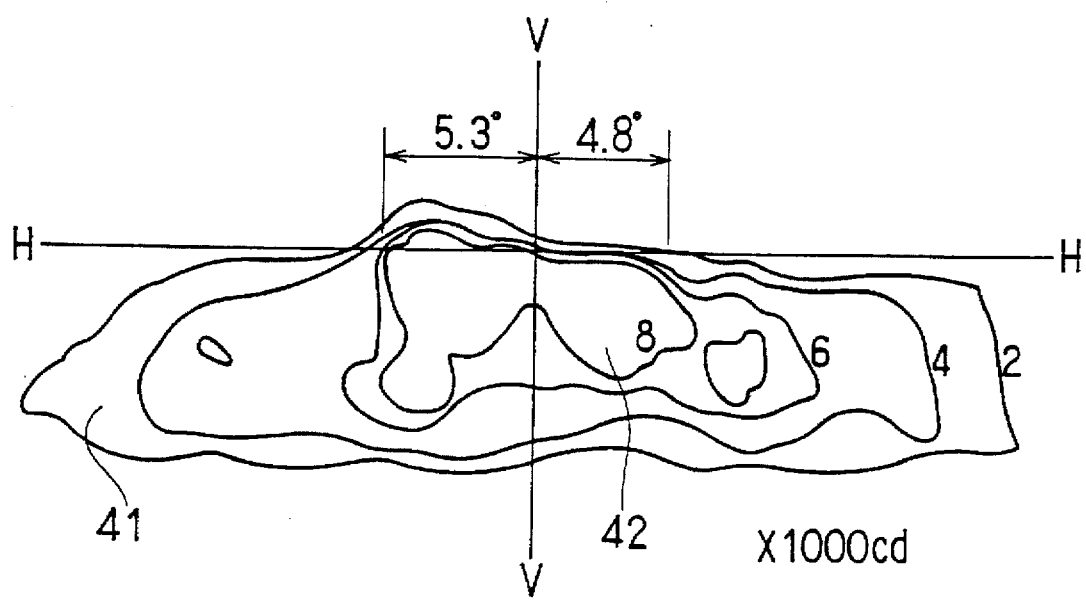
FIG. 3 is a graph illustrating experimental results of a luminous intensity of the light distribution according to the automotive illuminating device.

FIG. 3 shows experimental result of the luminous intensity of the light distribution of the automotive illuminating device mounted on a vehicle runs on the left side lane. As evident from this result, the hot zone light distribution 42 expands comparatively widely, i.e., 4.8° in an oncoming traffic side (a right side toward the projection direction) and 5.3° in the left side.

Figure 4B:
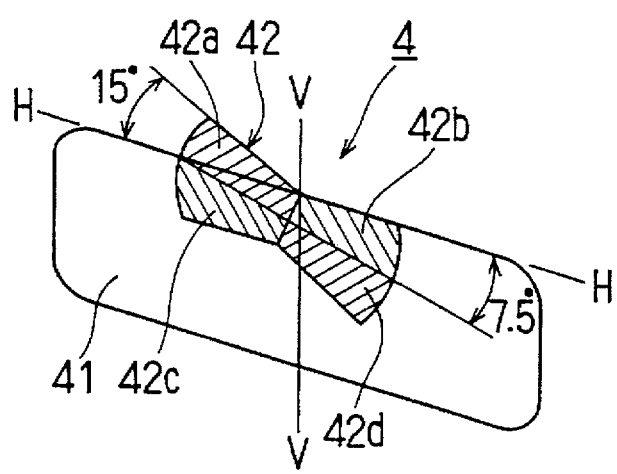
FIG. 4B is a view illustrating a light distribution of the device in FIG. 4A.
Figure 5A:
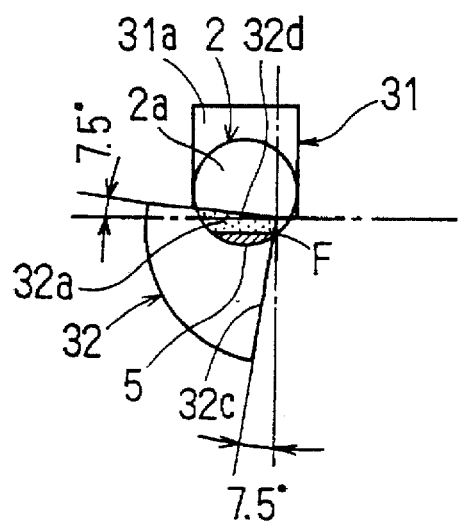
FIG. 5A is a view illustrating a positional relation among an outgoing surface of an optical fiber, each incident surface of a flat light distribution lens and a hot zone light distribution lens, and a shade of an automotive illuminating device according to a further embodiment of the present invention

As shown in FIG. 5A, in another embodiment, the reflection surface 32d of the hot zone light distribution lens 32 is inclined by 7.5° in the clockwise direction toward the projection direction. The other construction in this embodiment is the same as in the embodiment. As shown in FIG. 4B, the range of the hot zone light distribution 42 is reduced and the range of the flat light distribution 41 can be expanded.

Figure 4A:
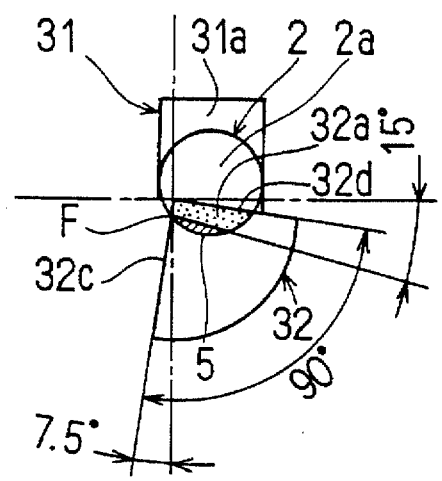
FIG. 4A is a view illustrating a positional relation among an outgoing surface of an optical fiber, each incident surface of a flat light distribution lens and a hot zone light distribution lens, and the shade of an automotive illuminating device according to another embodiment.
Figure 5B:
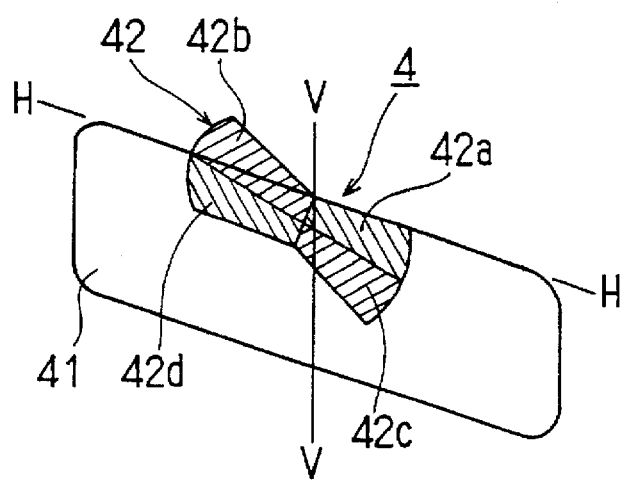
FIG. 5B is a view illustrating a light distribution of the device in FIG. 5A.

As shown in FIG. 5A, in a further embodiment, the optical fiber 2, the flat light distribution lens 31 and the hot zone light distribution lens 32 are disposed to be symmetrical with respect to a right and left side with a symmetrical axis of the reflection surface 32c of the hot zone light distribution lens 32 in FIG. 4A. Therefore, as shown in FIG. 5B, the range 42a of the hot zone light distribution 42 provided by the direct light is projected to the oncoming traffic side and the range 42b provided by the reflected light of the reflection surface 32c is projected to the left side so that the light distribution of this embodiment is opposite to the light distribution in FIG. 4B with respect to a right and left direction.

According to each embodiment described above, by using at least one reflection surface 32c of one hot zone light distribution lens 32, the hot zone light distribution 42 having the ranges 42a and 42b divided into right and left sides is formed. As a result, the construction is simplified and the hot zone light distribution 42 having a wide range can be obtained.

The ranges 42a and 42b shifted in the vertical direction are formed by the reflection surface 32c inclined relative to the vertical surface $V_0$. Therefore, when the automotive illuminating device is used for a head lamp, the range 42b positioned downward is disposed at the oncoming traffic so that no glaring is caused to oncoming vehicles. Since illuminating far ahead can be carried out by the range 42a positioned upward, the desired hot zone light distribution 42 can be obtained.

Since the top end $a_0$ of the range 42a positioned upward increases its height toward an outside (leftmost side), illuminating far can be carried out. Further, since the inclination angle of the reflection surface 32c is generally a half of the inclination angle of the top end $a_0$ of the range 42a positioned upward relative to the horizontal axis H—H, the top end $b_0$ of the range 42b positioned downward keeps nearly a horizontal level. Thus, no glaring to the oncoming vehicle is caused.

Although vehicles must keep either the right lanes or the left lanes by traffic regulations, when the automotive illuminating device is used for the vehicle head lamp, the range 42a positioned upward is positioned either at the right or at the left side when vehicles travel on the right lanes or the left lanes, respectively. In either case, the hot zone light distribution 42 can illuminate far without glaring to the drivers on the opposite lanes. In this case, the reflection surface in the vertical direction is positioned with inclination toward right or left when vehicles travel on the right or the left lanes, respectively.

Since the new range 42c can be formed by the reflected light reflected on the reflection surface 32d formed in addition to the reflection surface 32c in a roughly horizontal surface, the hot zone light distribution 42 having the ranges 42a and 42b by the reflection surface 32c and the new range 42c by the reflection surface 32d can be obtained.

Since the reflection surface 32d is positioned adjacent to the reflection surface 32c at the top end of the reflection surface 32c with the line C as the border in the projection direction, the hot zone light distribution 42 having the range 42a formed by the direct light projected from the hot zone light distribution lens 32 directly without being reflected on the reflection surfaces 32c and 32d, the range 42b formed by the reflected light projected after being reflected on the reflection surface 32c, the range 42c formed by the reflected light projected after being reflected on the reflection surface 32d and the range 42d formed by the reflected light projected after being reflected on both the reflection surfaces 32c and 32d can be obtained.

In the above-described embodiments, the light distribution with a projection range necessary for an automotive head lamp and ranging from a shoulder of a road to an opposite lane is provided by only one hot zone light distribution lens. Further, another hot zone light distribution lens can be installed to provide another light distribution overlapping the above-described projection range. Providing at least one hot zone light distribution lens forming the light distribution in right and left sides from the center of the projection range is important.

Figure 6:
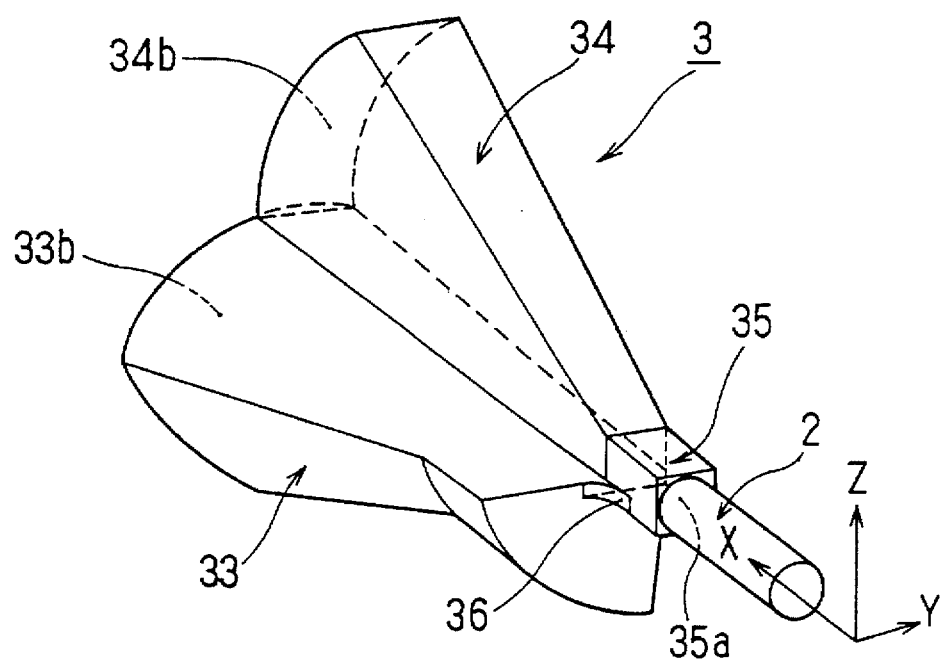
FIG. 6 is a perspective view illustrating a light distribution lens of an automotive illuminating device according to a still further embodiment of the present invention.
Figure 7:
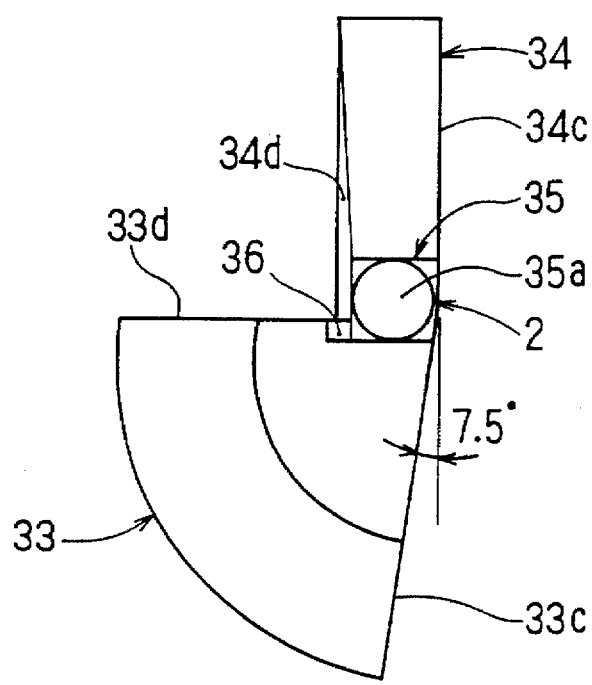
FIG. 7 is a view illustrating the light distribution lens of FIG. 6 seen in the X-axis direction in FIG. 6.

In the light distribution lens 3 according to a still further embodiment shown in FIGS. 6 and 7, a hot zone light distribution lens 33 and a flat light distribution lens 34 are formed integrally, while the hot zone light distribution lens 32 and the flat light distribution lens 31 of the above-described embodiments are formed separately and adhered to each other. The light distribution lens 3 is constructed with the hot zone light distribution lens 33, the flat light distribution lens 34 and a light introducing portion 35.

Each of the hot zone light distribution lens 33 and the flat light distribution lens 34 is constructed in the same manner as the hot zone light distribution lens 32 and the flat light distribution lens 31 in FIG. 1. However, the focal point of projection surfaces 33b and 34b of the lenses 33 and 34 respectively is disposed closely at a border between the projection surfaces 33b and 34b and the light introducing portion 35.

The light introducing portion 35 is positioned between the optical fiber 2 and each of lenses 33 and 34. The light introducing portion 35 is formed in a square pole shape having a square in longitudinal cross section. An enlarged incident light portion 36 is disposed to guide a portion of the incoming light to the hot zone light distribution lens 33.

In FIG. 7, a reflection surface 33c is inclined by 7.5° relative to the vertical surface of the hot zone light distribution lens 33. A horizontal reflection surface 33d of the hot zone light distribution lens 33, vertical reflection surfaces 34c and 34d of the flat light distribution lens 34 and an incident surface 35a (an incident surface of the light introducing portion 35) of the light distribution lens 3 are shown.

Figure 8:
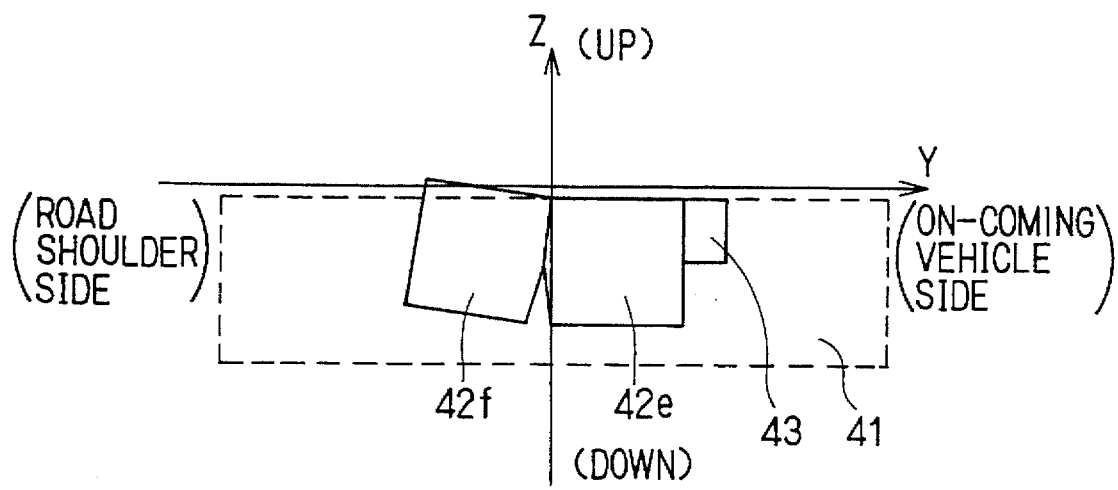
FIG. 8 is a view illustrating a light distribution image provided by the light distribution lens in FIG. 6.

The light distribution lens B constructed as described above forms a light distribution pattern as shown in FIG. 8. That is, the square-shaped flat light distribution 41 (a range surrounded by a dotted line in the figure) flattened in left and right directions by the flat light distribution lens 34 is formed. A hot zone light distribution 42e in a roughly square shape is formed by the direct light from the hot zone light distribution lens 33. A hot zone light distribution 42f in a roughly square shape is formed by the reflected light of the hot zone light distribution lens 33. A light distribution 43 is formed by the incoming light to the enlarged incident portion 36. Light distribution by other outgoing light is omitted.

A border portion between the hot zone light distribution 42e and the hot zone light distribution 42f forms a straight line and no unevenness in light distribution at this border is caused, because an incoming range of the hot zone light distribution lens 33 is in a square shape due to the square-pillar-shaped light introducing portion 35.

Since the light distribution 43 by the enlarged incident portion 36 is lower in brightness or luminous intensity than the hot zone light distribution 42e, the light distribution 43 can reduce, at the border portion between the hot zone light distribution 42e and the flat light distribution 41, a difference of the luminous intensity.

Figure 9:
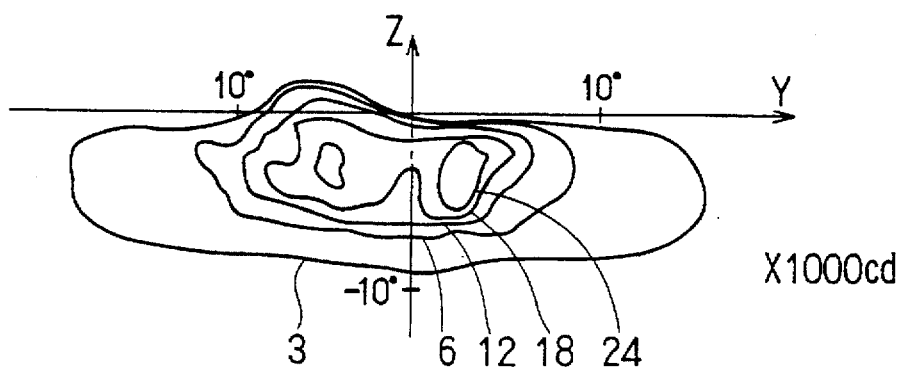
FIG. 9 is a graph illustrating a light distribution as a result of an optical simulation with respect to the light distribution lens in FIG. 6.

FIG. 9 is a graph illustrating a pattern of the light distribution which is a result of an optical simulation of the light distribution lens 3 in FIG. 6.

In the light distribution lens 3 in FIG. 6, the hot zone light distribution lens 33 and the flat light distribution lens 34 are formed integrally. Therefore, compared with the conventional light distribution lens in which the hot zone light distribution lens and the flat light distribution lens are formed separately, changes in light distribution and production of light deficit (dark line) caused by dust and water entering to an air gap or space formed between the lenses can be prevented. A lens fixing mechanism can be simplified. The light distribution lens can be constructed by only a hot zone light distribution lens. Further, the present invention can be applied to an illuminating device for not only vehicles but also motorcycles, vessels, airplanes or the like.

The present invention having been described should not be limited to the disclosed embodiments, but it may be modified in many other ways without departing from the scope and the spirit of the invention.

What is claimed is:

1. A light distribution lens comprising:

a light incident surface;

a light outgoing lens surface having a focal point in a vicinity of said light incident surface; and a light reflection surface forming a vertical surface between said light incident surface and said light outgoing lens surface;

light distribution from said light distribution lens including ranges extended toward right and left from a horizontal center of said light distribution by a direct light projected without being reflected on said light reflection surface, and a reflected light projected after being reflected on said light reflection surface, and said direct light and said reflected light being produced from light incoming from said light incident surface.

2. The light distribution lens according to claim 1, wherein:

said reflection surface is inclined by a predetermined angle relative to said vertical surface; and said ranges of said light distribution are vertically shifted in position corresponding to an inclination angle of said reflection surface.

3. A light distribution lens comprising:

a light incident surface;

a light outgoing surface; and a light reflection surface forming a vertical surface between said light incident surface and said light outgoing surface;

light distribution from said light distribution lens including ranges extended toward right and left from a horizontal center of said light distribution by a direct light projected without being reflected on said light reflection surface, and a reflected light projected after being reflected on said light reflection surface;

said direct light and said reflected light being produced from light incoming from said light incident surface;

said light reflection surface being inclined by a predetermined angle relative to said vertical surface;

said ranges of said light distribution being shifted vertically in position corresponding to an inclination angle of said light reflection surface;

one of said ranges positioned upward having a top end increasing a height thereof toward a horizontal outside; and said inclination angle of said light reflection surface being a half of an inclination angle of said top end relative to a horizontal surface.

4. The light distribution lens according to claim 3, wherein:

said light reflection surface is positioned so that said one of said ranges positioned upward by said light reflection surface is formed in one of a right side and a left side.

5. A light distribution lens comprising:

a light incident surface;

a light outgoing surface;

a first light reflection surface forming a vertical surface between said light incident surface and said light outgoing surface; and a second light reflection surface forming a roughly horizontal surface;

light distribution from said light distribution lens including ranges extended toward right and left from a horizontal center of said light distribution by a direct light projected without being reflected on said first light reflection surface, and a reflected light projected after being reflected on said first light reflection surface; and said direct light and said reflected light being produced from light incoming from said light incident surface.

6. The light distribution lens according to claim 5, wherein:

said second light reflection surface is formed adjacent to said first light reflection surface with a border of a line extending in a light projection direction at a top end of said first light reflection surface.

7. The light distribution lens according to claim 6, wherein:

said first light reflection surface is formed on a lens having a hot zone light distribution.

8. A light distribution lens comprising:

a first lens having a hot zone light distribution;

a second lens integral to said first lens and having a flat light distribution; and a light reflection surface formed on said first lens, said light reflection surface forming a vertical surface between a light incident surface and a light outgoing surface;

light distribution from said light distribution lens including ranges extended toward right and left from a horizontal center of said light distribution by a direct light projected without being reflected on said light reflection surface, and a reflected light projected after being reflected on said light reflection surface; and said direct light and said reflected light being produced from light incoming from said light incident surface.

9. The light distribution lens according to claim 1, further comprising:

a light introducing portion aligning and transmitting light from said light incident surface to said light outgoing lens surface.

10. A light distribution lens comprising:

a light incident surface;

a light outgoing surface; and a light reflection surface forming a vertical surface between said light incident surface and said light outgoing surface; and a light introducing portion aligning and transmitting light from said light incident surface to said light outgoing surface, said light introducing portion having an enlarged portion in said horizontal direction;

light distribution from said light distribution lens including ranges extended toward right and left from a horizontal center of said light distribution by a direct light projected without being reflected on said light reflection surface, and a reflected light projected after being reflected on said light reflection surface; and said direct light and said reflected light being produced from light incoming from said light incident surface.

11. A light distribution lens according to claim 1, wherein:

said light outgoing surface is a convex surface of a convex lens; and said light reflection surface is formed by two vertically extending parallel flat surfaces.

12. A light distribution lens according to claim 1, wherein:

said light distribution lens forms an automotive illumination device.

* * * * *